United States Patent
Shibahara

[19]

[11] Patent Number: 6,031,592
[45] Date of Patent: *Feb. 29, 2000

[54] REFLECTION LCD WITH COUNTER-REFLECTOR HAVING OPENINGS AT INTERSECTION AREAS OF BUS LINES

[75] Inventor: Hideo Shibahara, Tokyo, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/912,789

[22] Filed: Aug. 18, 1997

[30] Foreign Application Priority Data

Aug. 26, 1996 [JP] Japan ................................. 8-223858

[51] Int. Cl.[7] ........................ G02F 1/1335; G02F 1/1343
[52] U.S. Cl. ......................... 349/113; 349/139; 349/143
[58] Field of Search .................................. 349/113, 139, 349/147

[56] References Cited

U.S. PATENT DOCUMENTS

| | | |
|---|---|---|
| 4,869,576 | 9/1989 | Aoki et al. .............................. 349/139 |
| 4,948,231 | 8/1990 | Aoki et al. .............................. 349/139 |
| 5,040,875 | 8/1991 | Noguchi .................................. 349/139 |
| 5,309,264 | 5/1994 | Lien et al. .............................. 349/139 |
| 5,710,611 | 1/1998 | Suzuki et al. .......................... 349/139 |
| 5,726,721 | 3/1998 | Suiyoshi et al. ........................ 349/139 |

*Primary Examiner*—William L. Sikes
*Assistant Examiner*—Toan Ton
*Attorney, Agent, or Firm*—Sughrue, Mion, Zinn, Macpeak & Seas, PLLC

[57] ABSTRACT

A reflection type liquid crystal display comprising an active matrix board having active matrix elements at the intersections of signal lines formed of a transparent conducting film and scanning lines formed of a metal, a counter electrode board having a reflector layer thereon, and a liquid crystal sealed between the active matrix board and the counter electrode board which are bonded so that the film-bearing surfaces thereof face each other, wherein the reflector layer is not formed in those parts of the counter electrode board which correspond to the signal lines formed of the transparent conducting film and disposed on the active matrix board.

4 Claims, 14 Drawing Sheets

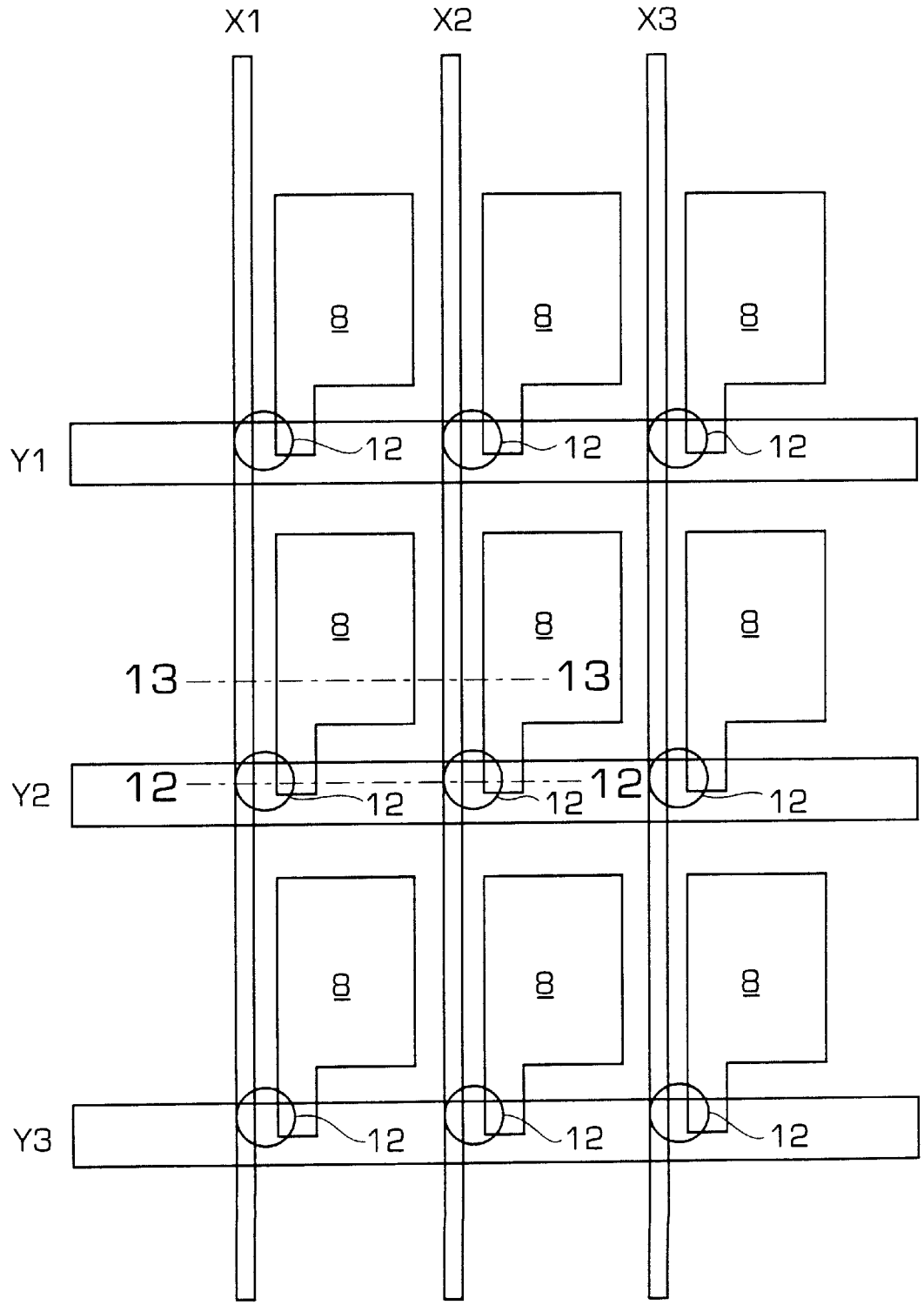

REFLECTION LCD WITH COUNTER-REFLECTOR HAVING OPENINGS AT INTERSECTION AREAS OF BUS LINES

BACKGROUND OF THE INVENTION

1. Field of the Invention

This invention relates to liquid crystal displays and, more particularly, to the improvement of image quality in reflection type liquid crystal displays using no back light.

2. Description of the Related Art

Liquid crystal displays are devices in which a liquid crystal layer having a thickness of the order of 5 μm is sandwiched between two glass plates having electrodes thereon and images are displayed by controlling the movement of the liquid crystal molecules. Accordingly, they can provide much thinner display units than CRTs.

In a common TN liquid crystal display, images are displayed by disposing a back light source on the outside of the liquid crystal display and controlling the liquid crystal molecules so as to transmit or absorb light from the back light source. This is called a transmission type liquid crystal display. The transmission type liquid crystal display has the disadvantage that the use of a back light source causes an increase in power consumption.

One means for solving this problem is provided by a reflection type liquid crystal display in which external light is introduced and reflected instead of using back light. When a reflector is disposed on the outside of a TN liquid crystal display, this liquid crystal display has the disadvantages that the displayed image is generally dark and the displayed characters or the like produce shadows. The reason for the darkening is that the TN liquid crystal display requires polarizers and, therefore, the amount of external light introduced is reduced to one half. The reason why the displayed characters or the like produce shadows is that, since a reflector is disposed on the outside, there is a great distance between the display screen and the reflective surface and, therefore, the display screen is mirrored in the reflector.

A liquid crystal display of the phase transition guest-host (GH) type has low contrast and is seldom used as a transmission type liquid crystal display using back light. However, when this is used as a reflection type liquid crystal display, it is more disadvantageous than the TN liquid crystal display. That is, since no polarizer is required, the amount of light introduced is greater and the displayed image becomes brighter. Moreover, since a reflector may be formed within the liquid crystal layer, the displayed characters or the like produce no shadow.

The operating principle of a liquid crystal display of the GH type is described with reference to the schematic section of FIG. 7. As shown in FIG. 7, this liquid crystal display includes, on the panel surface side, a glass substrate 1 on which an ITO layer 2 and a polyimide layer 5 serving as a protective layer are formed in that order. On the opposed board side, it also includes a glass substrate 1 having a reflector layer 6 and a polyimide layer 5 formed thereon. A GH liquid crystal layer 7 is sandwiched therebetween to construct the liquid crystal display. In this GH liquid crystal layer 7, several percent of dichroic dye molecules 3 are mixed with liquid crystal molecules 4. These dichroic dye molecules 3 do not change their direction under the influence of an electric field. However, since dichroic dye molecules 3 have a size almost equal to that of liquid crystal molecules 4, they behave in the same manner as the large number of liquid crystal molecules 4. Moreover, dichroic dye molecules 3 transmit or absorb light according to their direction. That is, in the absence of an applied voltage as shown in FIG. 7(a), dichroic dye molecules 3 are horizontally oriented, and exhibit a spiral configuration in the presence of a chiral dopant. If the angle of twist is greater than 90 degrees, any type of polarized light 19 entering the panel from its surroundings is absorbed, so that the panel looks black. On the other hand, in the presence of an applied voltage as shown in FIG. 7(b), dichroic dye molecules 3 are vertically oriented in conformity with the orientation of the liquid crystal molecules. Consequently, incident light is transmitted by GH liquid crystal layer 7, is reflected by the upper reflector layer 6, and exits as outgoing light 20, so that the panel looks white.

As reflector layer 6, there is commonly used a metal film formed by depositing a metal having high reflectivity (e.g., aluminum or silver) on substrate 1 by sputtering or vapor deposition.

The circuit of an active matrix-driven liquid crystal display actually used to display images is described with reference to FIG. 8. In FIG. 8(a), image signals are applied to signal lines X1, X2, . . . , Xn. At each of the intersections of these signal lines and scanning lines Y1, Y2, . . . , Yn, a thin-film transistor (TFT) 12 is connected. This TFT 12 is connected to a pixel electrode, so that the pixel electrode and the counter electrode, together with a liquid crystal sandwiched therebetween, constitute a pixel electrode capacitance 13. As shown in FIG. 8(b), drive pulses Z1, Z2, . . . , Zn are successively applied to scanning lines Y1, Y2, . . . , Yn. Taking scanning line Y1 as an example, TFTs 12 connected to scanning line Y1 are in the conducting state during a period in which drive pulse Z1 has a voltage of 20 V. As a result, the electric potential of the image signals applied to the signal lines is written into pixel electrode capacitance 13 constituted by the pixel electrodes and counter electrode 14 with the liquid crystal sandwiched therebetween. The period in which drive pulse Z1 has a voltage of 20 V is equal to 1/60 n second which is obtained by dividing the screen rewriting time, i.e., 1/60 second by the number (n) of the scanning lines. Next, TFTs 12 connected to scanning line Y1 are in the non-conducting state during a period in which drive pulse Z1 has a voltage of 0 V. Thus, the electric potentials of the image signals written into pixel capacitance 13 are retained until the voltage of drive pulse Z1 is increased to 20 V in the next scan. In this manner, an image is displayed. TFTs of the type commonly used in active matrix-driven liquid crystal displays are forward-staggered TFTs. These forward-staggered TFTs can be manufactured by two patterning steps and are frequently used because of their ease of manufacture.

A process for fabricating an active matrix-driven liquid crystal display by using these TFTs is described below. First of all, the method of making a TFT board is explained with reference to FIG. 9.

A glass substrate 1 is provided as shown in FIG. 9(a) and an ITO layer 2 is deposited thereon by means of a sputtering apparatus as shown in FIG. 9(b). A resist is applied thereto, exposed to light with a suitable exposure apparatus through a mask having patterns for defining signal lines and pixel electrodes, and then developed to leave the resist having, for example, the patterns of signal line X and pixel electrode 8. Next, ITO layer 2 is etched by using the patterned resist as a mask to form signal line X and pixel electrode 8. Thereafter, the resist is stripped off as shown in FIG. 9(c). Subsequently, after an ohmic contact layer is formed only on the patterned regions of ITO layer 2 by plasma treatment in a plasma CVD apparatus, an amorphous silicon layer 9 and a silicon nitride layer 10 are deposited thereon by means of a plasma CVD apparatus and a chromium layer 11 is deposited thereon by means of a sputtering apparatus as shown in FIG. 9(d). A resist is applied thereto, exposed to light with an exposure apparatus through a mask having patterns for defining scanning lines, and then developed to leave the resist having the patterns of the scanning lines. Next, chromium layer 11, silicon nitride layer 10 and amorphous silicon layer 9 are etched by using the patterned resist as a mask, and the resist is then stripped off [FIG. 9(e)]. Finally, a polyimide is applied with a printer and then rubbed to obtain a TFT board as shown in FIG. 9(f).

Next, the method of making a counter electrode board is illustrated in FIG. 10. A glass substrate 1 is provided [FIG. 10(a)] and a reflector layer 6 consisting of aluminum or silver having high reflectivity is deposited thereon by means of a sputtering apparatus [FIG. 10(b)]. Subsequently, a polyimide is applied with a printer and then rubbed to obtain a counter electrode board as shown in FIG. 10(c).

Then, the TFT board and the counter electrode board which have been made in the above-described manner are bonded with a predetermined gap therebetween. First of all, a sealant is printed on the film-bearing surface of the TFT board by means of a seal printer. This sealant functions as an adhesive for bonding the two boards. In order to secure a predetermined gap between the two boards, a gapping material in particulate form is incorporated in the sealant. Then, the TFT board and the counter electrode board are bonded with the sealant so that the film-bearing surfaces thereof face each other.

Finally, using a liquid crystal injector, a GH liquid crystal is injected into the gap between the two boards so bonded to fabricate an active matrix-driven reflection type liquid crystal display. A plan of this liquid crystal display is shown in FIG. 11. As shown in this figure, signal lines X1, X2, . . . , Xn and scanning lines Y1, Y2, . . . , Yn are disposed crosswise on the TFT board. TFTs 12 are formed in the vicinity of the respective intersections of the signal lines and the scanning lines. A schematic section taken along line A-B in FIG. 11 is shown in FIG. 12, and a schematic section taken along line C-D in FIG. 11 is shown in FIG. 13.

In this active matrix-driven reflection type liquid crystal display, an arbitrarily chosen voltage is always applied to the signal lines and the scanning lines, so that the portions of the liquid crystal above the signal lines and the scanning lines are in the light-transmitting state. However, as shown in FIG. 12, chromium layer 11 forming the scanning lines does not transmit light and, therefore, light 19 striking on this region does not pass through chromium layer 11. In contrast, as shown in FIG. 13, ITO layer 2 forming the signal lines and the pixel electrodes is transparent and hence transmits light. Consequently, light is transmitted not only in the region of pixel electrode B to which a voltage is applied, but also in the regions of signal lines X1 and X2. This light is reflected by the counter electrode board and exits to the outside (as indicated by arrows 21).

In conventional panel structures, an arbitrarily chosen voltage is always applied to transparent electrodes forming signal lines, as described above. Consequently, the portions of the liquid crystals are oriented under the influence of the resulting electric field and are in a partially transmitting state. The light striking on these regions is reflected by a reflector layer and exits to the outside. That is, a reduction in contrast due to the leakage of light through the signal lines has posed a problem. Moreover, when a white spot is displayed on the screen by switching on, for example, the TFT formed in the vicinity of the intersection of signal line X2 and scanning line Y2, as shown in FIG. 14, a white stripe is displayed in the region of the signal line which is also in the transmitting state, and makes the image difficult to see. The occurrence of such a phenomenon (what is so-called "cross talk") has also posed a problem.

SUMMARY OF THE INVENTION

Accordingly, it is an object of the present invention is to prevent the leakage of light through the regions of signal lines formed of transparent electrodes.

According to the present invention, there is provided a reflection type liquid crystal display comprising an active matrix board having active matrix elements at the intersections of signal lines formed of a transparent conducting film and scanning lines formed of a metal, a counter electrode board having a reflector layer thereon, and a liquid crystal sealed between the active matrix board and the counter electrode board which are bonded so that the film-bearing surfaces thereof face each other, characterized in that the reflector layer is not formed in those parts of the counter electrode board which correspond to the signal lines formed of the transparent conducting film and disposed on the active matrix board.

In the liquid crystal display constructed in the above-described manner, the counter electrode also serving as a reflector layer does not exist above the signal lines formed of the transparent conducting film. Accordingly, an electric field is scarcely applied to the portions of the liquid crystal which exist above the signal lines, and the light entering through the regions of the signal lines is not reflected, so that these portions never pass into the transmitting state. Consequently, the liquid crystal above the signal lines always remains in the non-transmitting state, regardless of the voltages applied to the signal lines. This makes it possible to prevent the disadvantages of conventional panel structures, i.e., a reduction in contrast which is caused by the light-transmitting state of the liquid crystal above the signal lines, and the phenomenon ("cross talk") in which, when characters or the like are displayed on the screen, vertical stripes are produced in the inherently dark background and makes the characters or the like difficult to see.

BRIEF DESCRIPTION OF THE DRAWINGS

FIG. 11 is a plan of a conventional active matrix-driven liquid crystal display.

DETAILED DESCRIPTION OF THE PREFERRED EMBODIMENTS

The present invention is more specifically explained with reference to the following examples. However, these examples are not to be construed to limit the scope of the invention.

EXAMPLE 1

Figure 1:
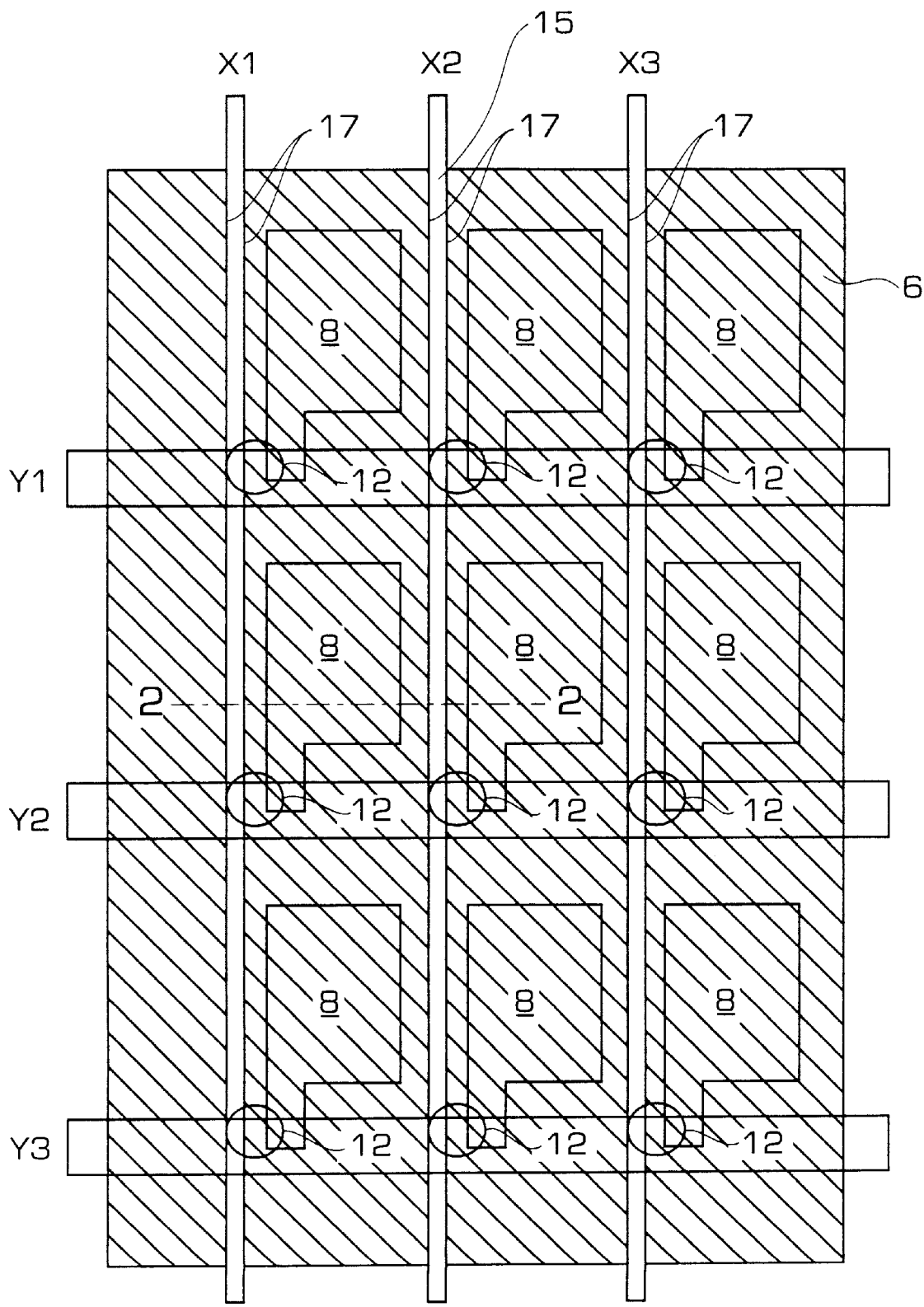
FIG. 1 is a plan of a TFT board in accordance with the present invention.
Figure 2:
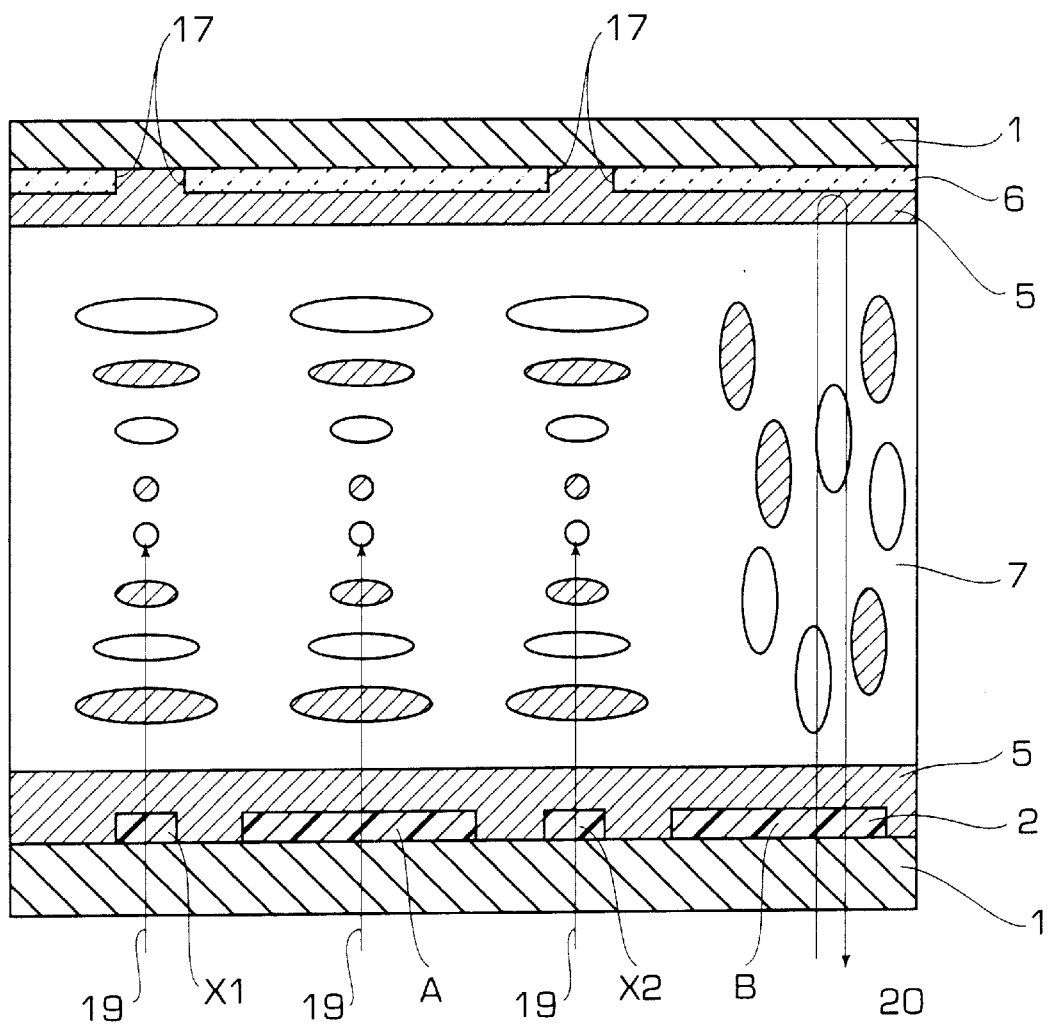
FIG. 2 is a section taken along line E-F in FIG. 1, showing a first example of the present invention.

Example 1 of the present invention is described with reference to FIG. 1 showing a schematic plan and FIG. 2 showing a section taken along line E-F in FIG. 1.

Referring to FIG. 1, signal lines X1, X2 and X3 and scanning lines Y1, Y2 and Y3 are disposed crosswise on a TFT board. TFTs 12 are disposed in the vicinity of the respective intersections of the signal lines and the scanning lines. In a reflector layer 6 (hatched area) deposited on a counter electrode board, only the parts located above the signal lines are removed to form slits 17.

Next, the operation of this liquid crystal device is explained with reference to FIG. 2. In FIG. 2, signal lines X1 and X2 and pixel electrodes A and B are formed by patterning a transparent conducting film 2 deposited on a glass substrate 1. Moreover, a polyimide layer 5 serving as a protective layer is formed thereon to construct a TFT board. Furthermore, a GH liquid crystal layer 7 is interposed between this TFT board and a counter electrode board comprising a glass substrate 1 having a reflector layer 6 deposited thereon to construct a liquid crystal panel. In reflector layer 6 deposited on the counter electrode board, only the parts lying opposite to the signal lines on the TFT board are removed to form slits 17.

The portion of GH liquid crystal layer 7 above pixel electrode A presents a state in which there is no potential difference between reflector layer 6 and pixel electrode A. In this state, incident light 19 is absorbed by the GH liquid crystal layer, so that this region of the panel looks black. On the other hand, the portion of GH liquid crystal layer 7 above pixel electrode B presents a state in which there is a potential difference between reflector layer 6 and pixel electrode B. In this state, incident light 19 is transmitted by GH liquid crystal layer 7, is reflected by reflector layer 6, and exits as outgoing light 20, so that this region of the panel looks white.

Since reflector layer 6 does not exist above signal lines X1 and X2, the portions of GH liquid crystal layer 7 above signal lines X1 and X2 are in a state in which there is no potential difference between signal lines X1 or X2 and reflector layer 6. In this state, incident light 19 is absorbed by the GH liquid crystal layer, so that these regions of the panel look black. Even if the electric potentials of the signal lines are changed, no potential difference is produced because reflector layer 6 also serving as a counter electrode does not exist above the signal lines. As a result, these regions of the panel always look black.

Figure 14:
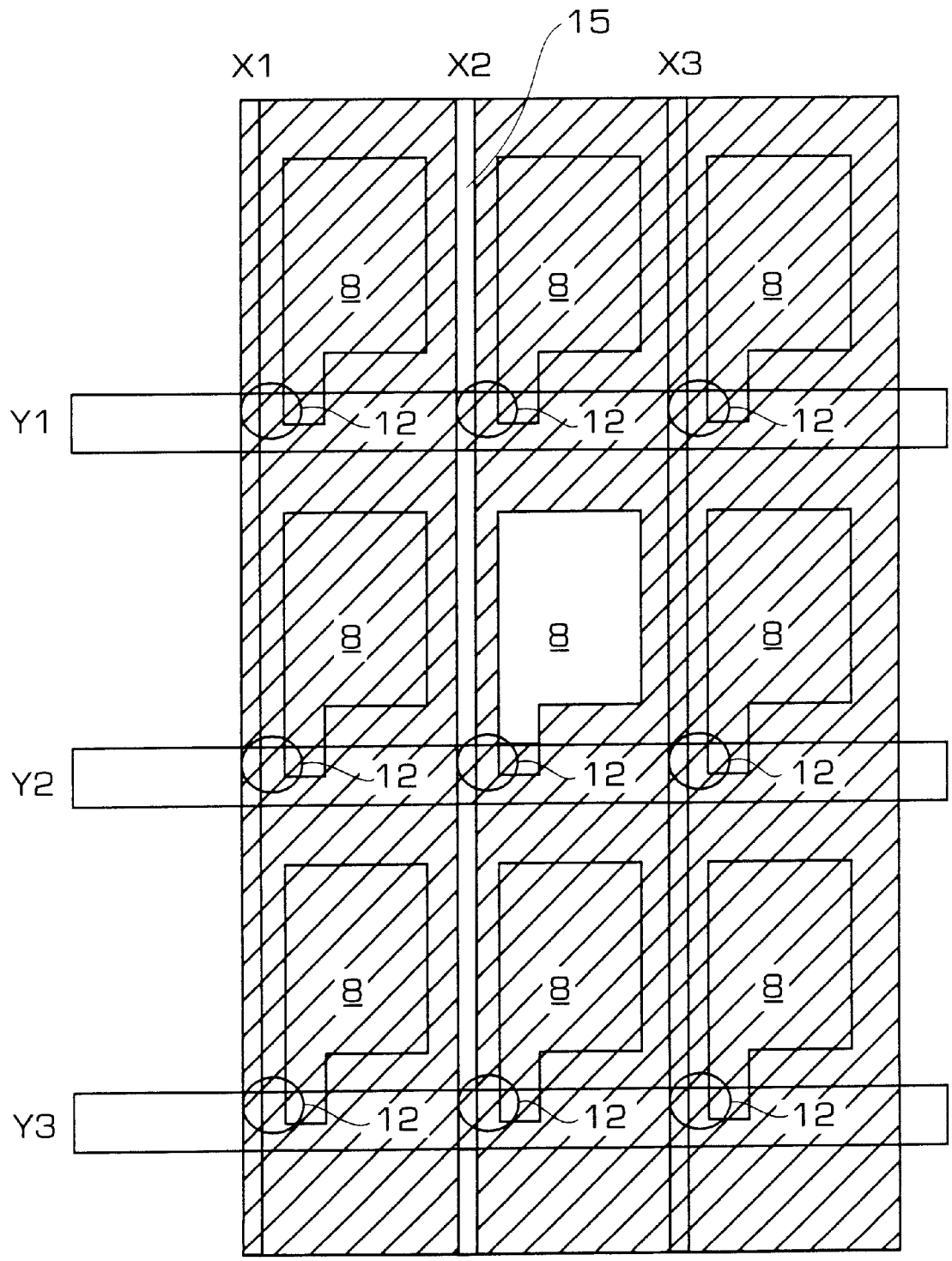
FIG. 14 is a plan showing the occurrence of cross talk in a conventional active matrix-driven liquid crystal display.

This makes it possible to prevent the shortcomings observed in conventional panel structures, i.e., a reduction in contrast caused by the light-transmitting state of the liquid crystal above signal lines, and the occurrence of cross talk as described with reference to FIG. 14. Moreover, the white-to-black contrast is improved from the conventional value of 1:3 to 1:5.

Now, the process for fabricating the above-described liquid crystal display is described below.

The method of making the TFT board is the same as known in the prior art. That is, as described previously, the TFT board is-made according to the steps shown in FIG. 9.

Figure 3A:
In FIGS. 3, (a) to (d) show sections illustrating a series of steps in the method of making a counter electrode board in accordance with the first example of the present invention.
Figure 3B:
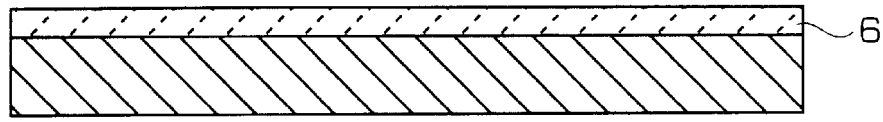
Figure 3C:
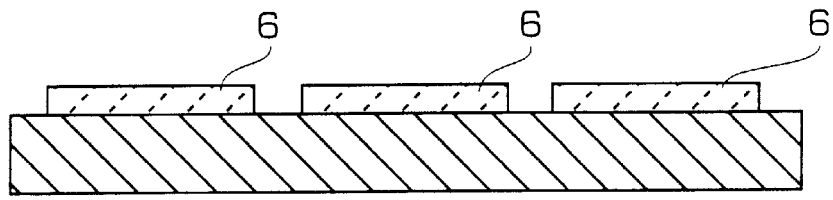
Figure 3D:
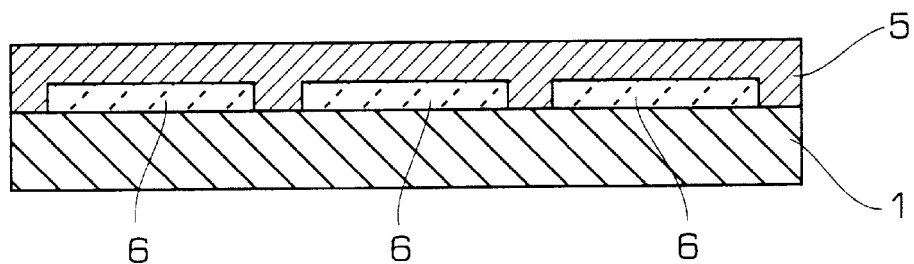

The method of making the counter electrode board is explained with reference to FIG. 3. First of all, a glass substrate 1 is provided as shown in FIG. 3(a) and a film of aluminum or silver having high reflectivity is deposited thereon by means of a sputtering apparatus as shown in FIG. 3(b). A resist is applied thereto, exposed to light with an exposure apparatus through a mask having a pattern in which the parts corresponding to the signal lines patterned on the TFT board are removed in the form of slits, and then developed to leave the resist having the aforesaid pattern. Next, the metal film is etched by using the patterned resist as a mask to remove the parts of the metal film which are not covered with the mask. Thereafter, the resist is stripped off as shown in FIG. 3(c). Finally, a polyimide is applied with a printer and then rubbed to complete the counter electrode board as shown in FIG. 3(d) Then, the TFT board and the counter electrode board which have been made in the above-described manner are bonded with a predetermined gap therebetween. First of all, a sealant is printed on the film-bearing surface of the TFT board by means of a seal printer. In order to secure a predetermined gap between the two boards, a gapping material in particulate form is incorporated in the sealant. Then, the TFT board and the counter electrode board are bonded with the sealant so that the film-bearing surfaces thereof face each other. In this step, the two boards are disposed in such a way that, when viewed from the outside of the panel, the patterns of the signal lines on the TFT board are aligned with the slits on the counter electrode board. Finally, using a liquid crystal injector, a GH liquid crystal is injected into the gap between the two boards so bonded. Thus, an active matrix-driven reflection type liquid crystal display as illustrated in FIGS. 1 and 2 is fabricated.

EXAMPLE 2

Figure 6:
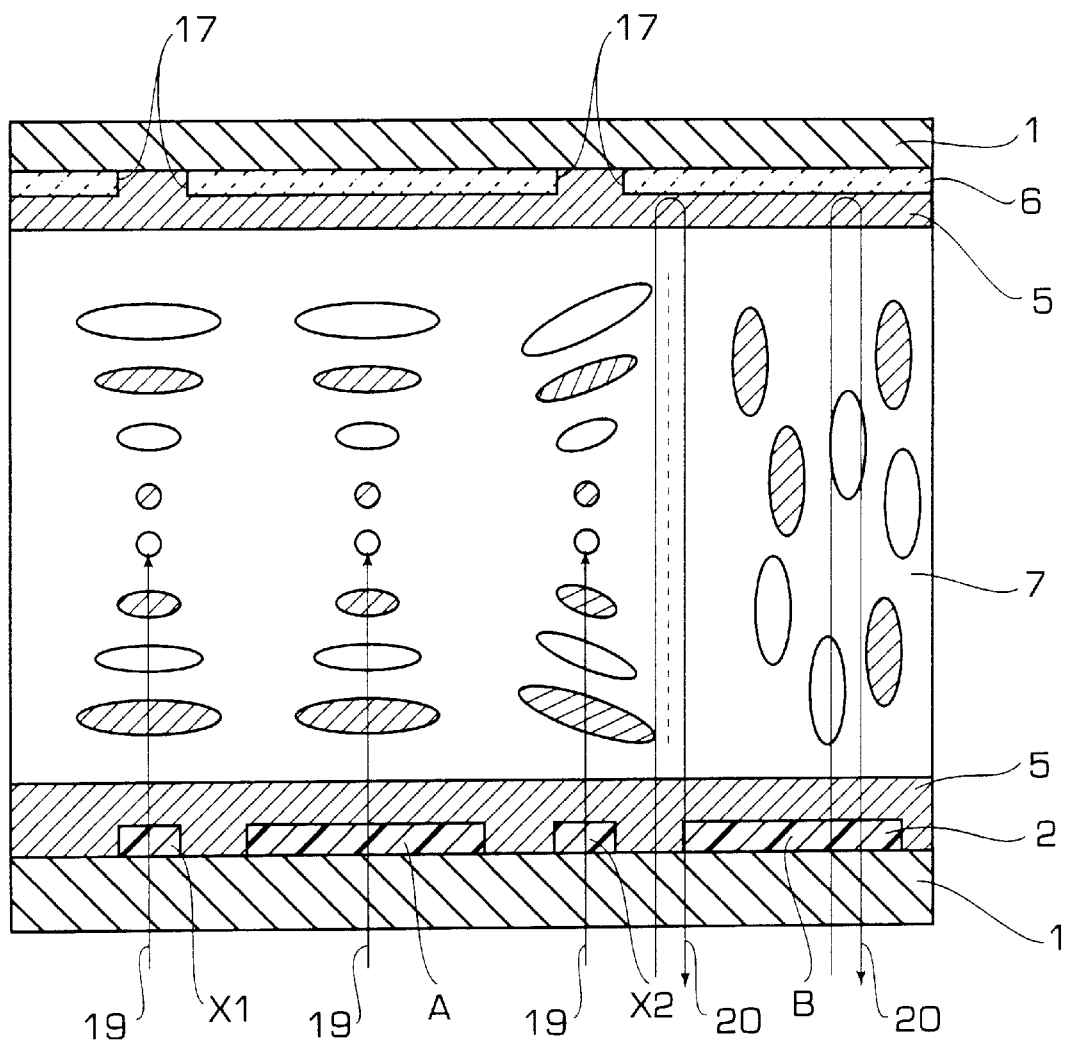
FIG. 6 is a section for explaining the occurrence of disclination.
Figure 7A:
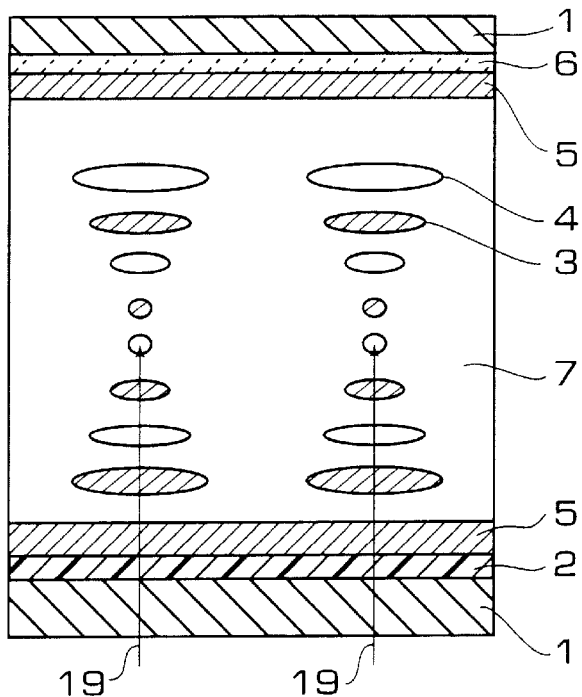
FIG. 7 includes sections for explaining the operating principle of a conventional liquid crystal display of the phase transition GH type, (a) showing its state in the absence of an applied voltage and (b) showing its state in the presence of an applied voltage.
Figure 7B:
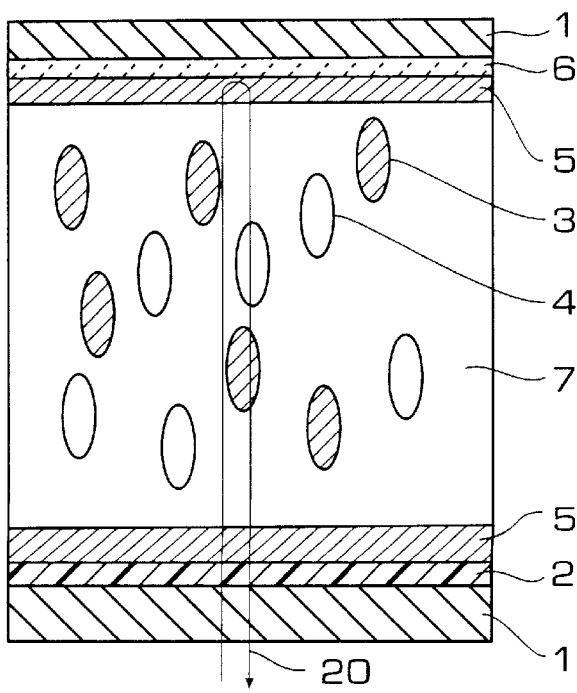
Figure 8A:
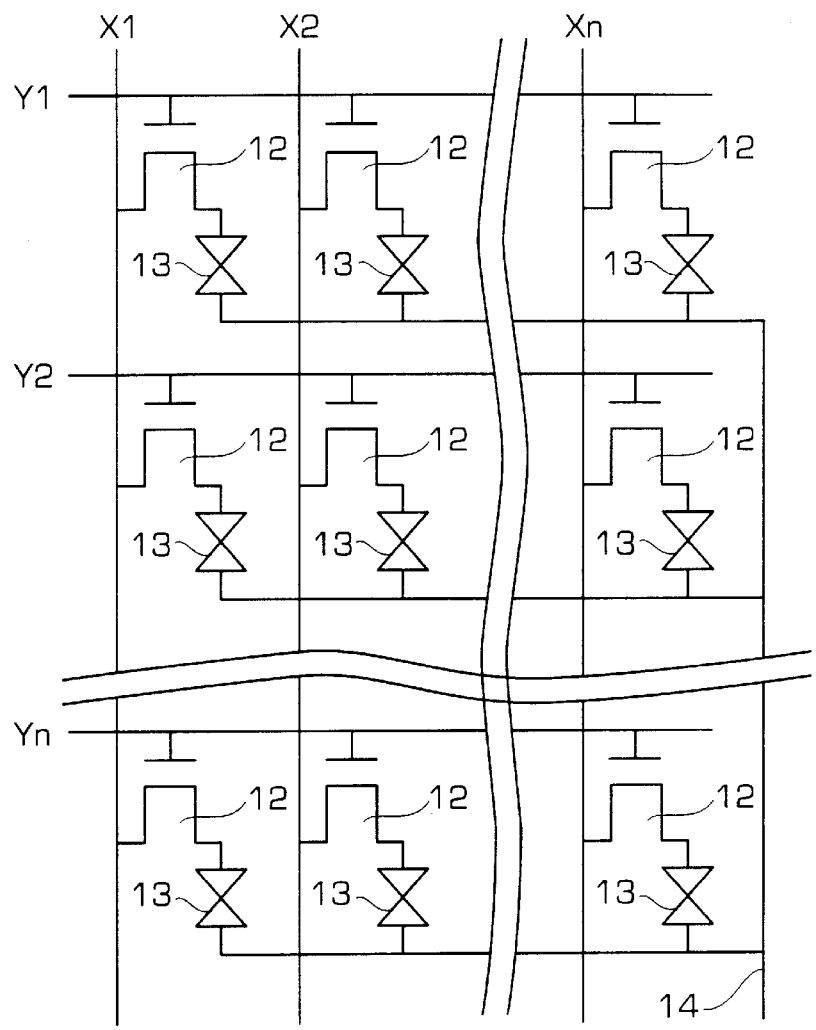
FIG. 8 includes an equivalent circuit diagram (a) of a conventional active matrix-driven liquid crystal display, and a diagram (b) showing drive pulses applied successively to scanning lines.
Figure 8B:
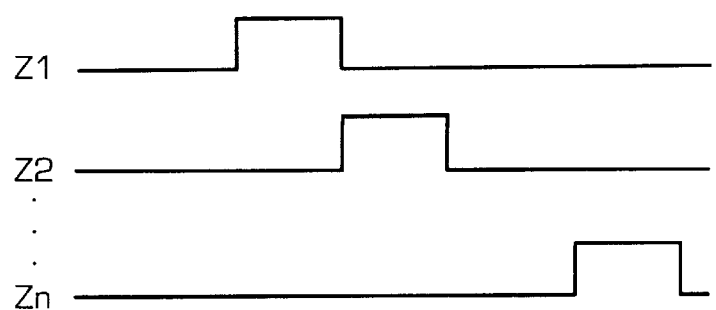
Figure 9A:
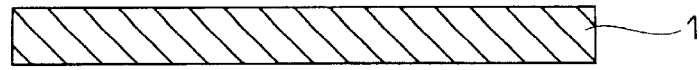
In FIGS. 9, (a) to (f) show sections illustrating a series of steps in the method of making a TFT board.
Figure 9B:
Figure 9C:
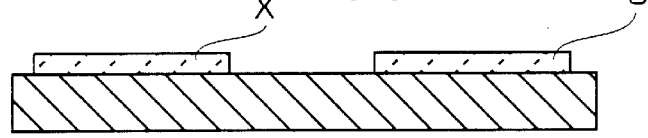
Figure 9D:
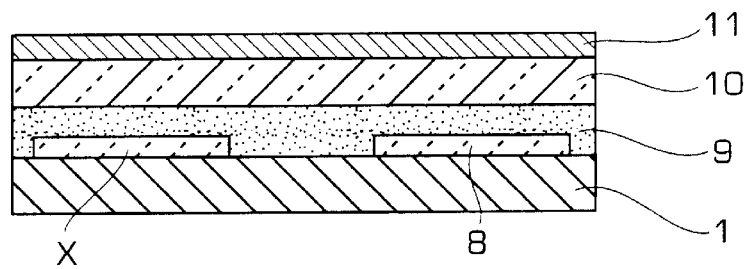
Figure 9E:
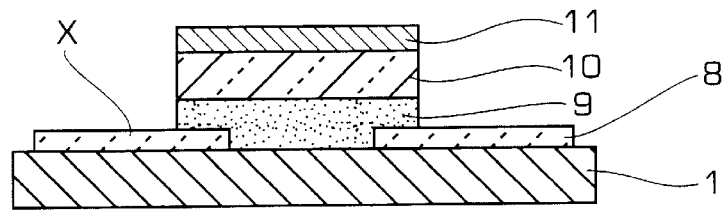
Figure 9F:
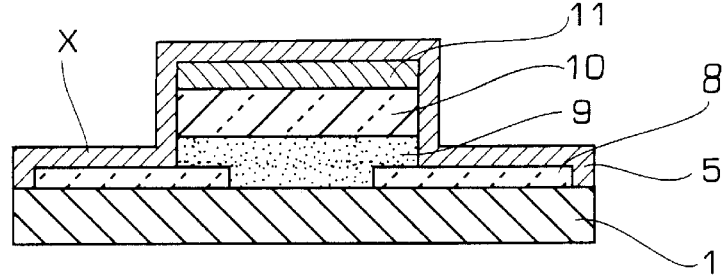
Figure 10A:
In FIGS. 10, (a) to (c) show sections illustrating a series of steps in the method of making a conventional counter electrode board.
Figure 10B:
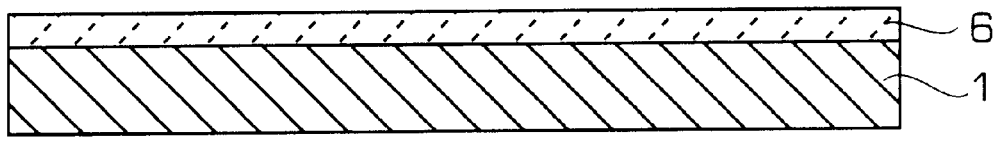
Figure 10C:
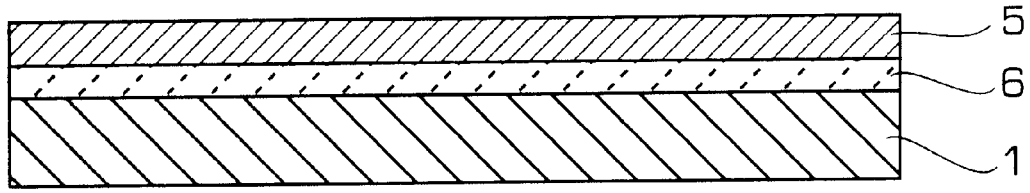
Figure 12:
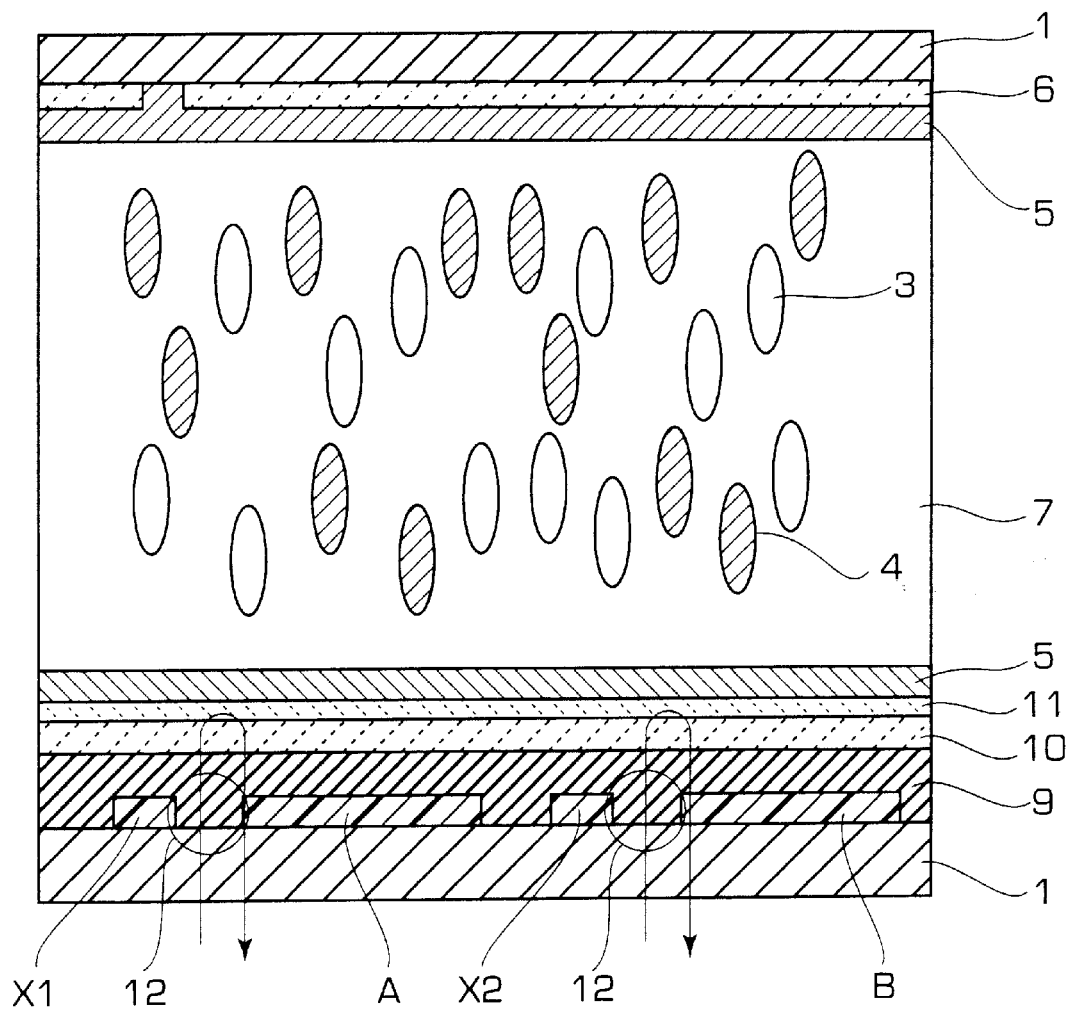
FIG. 12 is a section taken along line A-B in FIG. 11.
Figure 13:
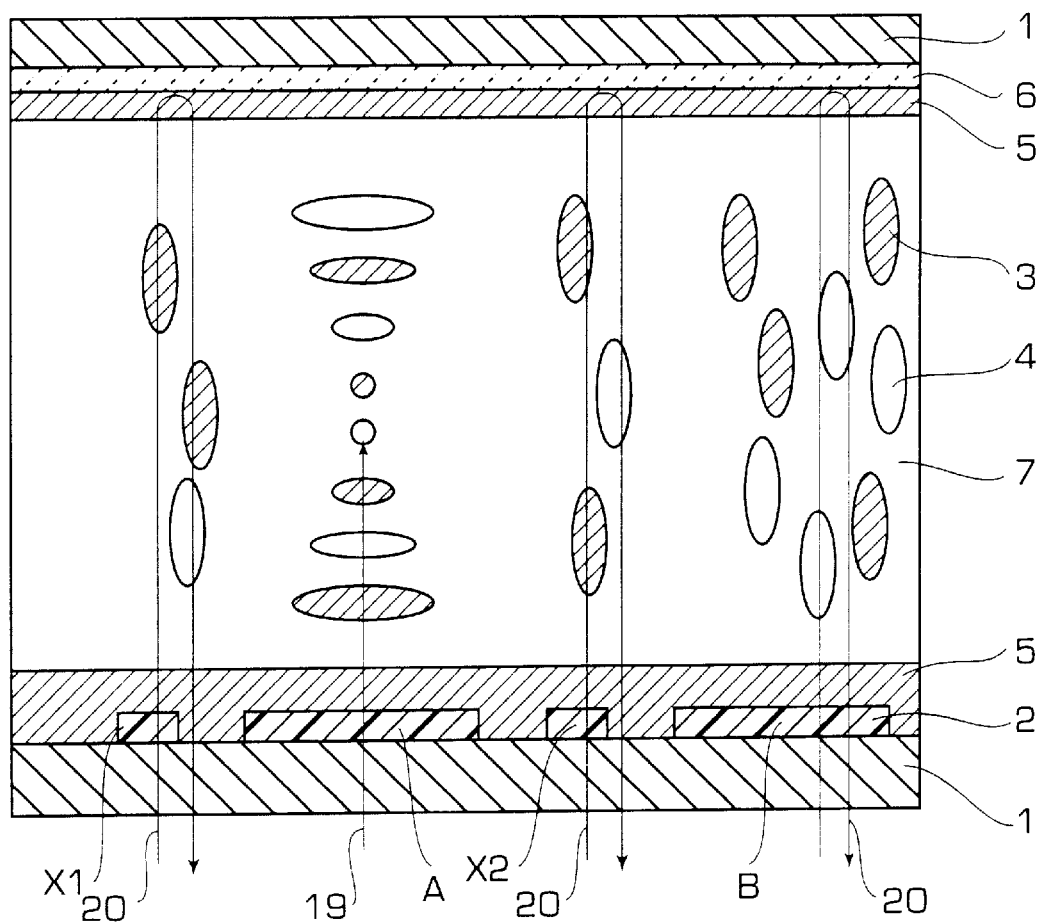
FIG. 13 is a section taken along line C-D in FIG. 11.

Referring to FIG. 6, in the liquid crystal display of Example 1, there is an electric field between pixel electrode B and reflector layer 6. Consequently, a disclination line 16 comprising a discontinuity part of the orientation may be produced in the GH liquid crystal layer owing to a transverse electric field created between pixel electrode B and the end of reflector layer 6, and a transverse electric field created between scanning line X2 and the end of reflector layer 6. In this case, light may leak through this region and produce an image of poor quality.

In the liquid crystal display of Example 2, reflector layer 6 is wholly covered with an ITO layer 2 constituting a transparent conducting layer, so that the creation of a transverse electric field is prevented. Now, the operation of this liquid crystal device is explained below. The portion of GH liquid crystal layer 7 above pixel electrode A presents a state in which there is no potential difference between reflector layer 6 and pixel electrode A. In this state, incident light 19 is absorbed by GH liquid crystal layer 7, so that this region of the panel looks black. On the other hand, the portion of GH liquid crystal layer 7 above pixel electrode B presents a state in which there is a potential difference between reflector layer 6 and pixel electrode B. In this state, incident light 19 is transmitted by GH liquid crystal layer 7. However, since reflector layer 6 does not exist on the regions of the counter electrode board which lie opposite to signal lines X1 and X2, incident light 19 passes through the entire panel. As a result, these regions of the panel look black.

In this example, no transverse electric field is created between scanning line X2 and the end of reflector layer 6. Consequently, a disclination line 16 comprising a discontinuity part of the orientation is not produced in the GH liquid crystal layer even under the influence of a transverse electric field created between pixel electrode B and the end of reflector layer 6 as described above with reference to FIG. 6. Thus, the problem that light may leak through this region and produce an image of poor quality can be solved.

Now, the process for fabricating this liquid crystal display is described below. The difference from Example 1 lies in the fact that an ITO layer is additionally formed on the reflector layer of the counter electrode board of Example 1.

The method of making the TFT board is the same as employed in Example 1.

The method of making the counter electrode board is explained with reference to FIG. 5. First of all, a glass substrate 1 is provided as shown in FIG. 5(*a*) and a film of aluminum or silver having high reflectivity is deposited thereon by means of a sputtering apparatus as shown in FIG. 5(*b*). A resist is applied thereto, exposed to light with an exposure apparatus through a mask having a pattern in which the parts corresponding to the signal lines patterned on the TFT board are removed in the form of slits, and then developed to leave the resist having the aforesaid pattern. Next, the metal film is etched by using the patterned resist as a mask to remove the parts of the metal film which are not covered with the mask. Thereafter, the resist is stripped off as shown in FIG. 5(*c*). Subsequently, an ITO layer 2 is deposited on the whole surface of glass substrate 1 so as to cover reflector layer 6 as shown in FIG. 5(*d*). Finally, a polyimide is applied with a printer and then rubbed to complete the counter electrode board as shown in FIG. 5(*e*).

Figure 4:
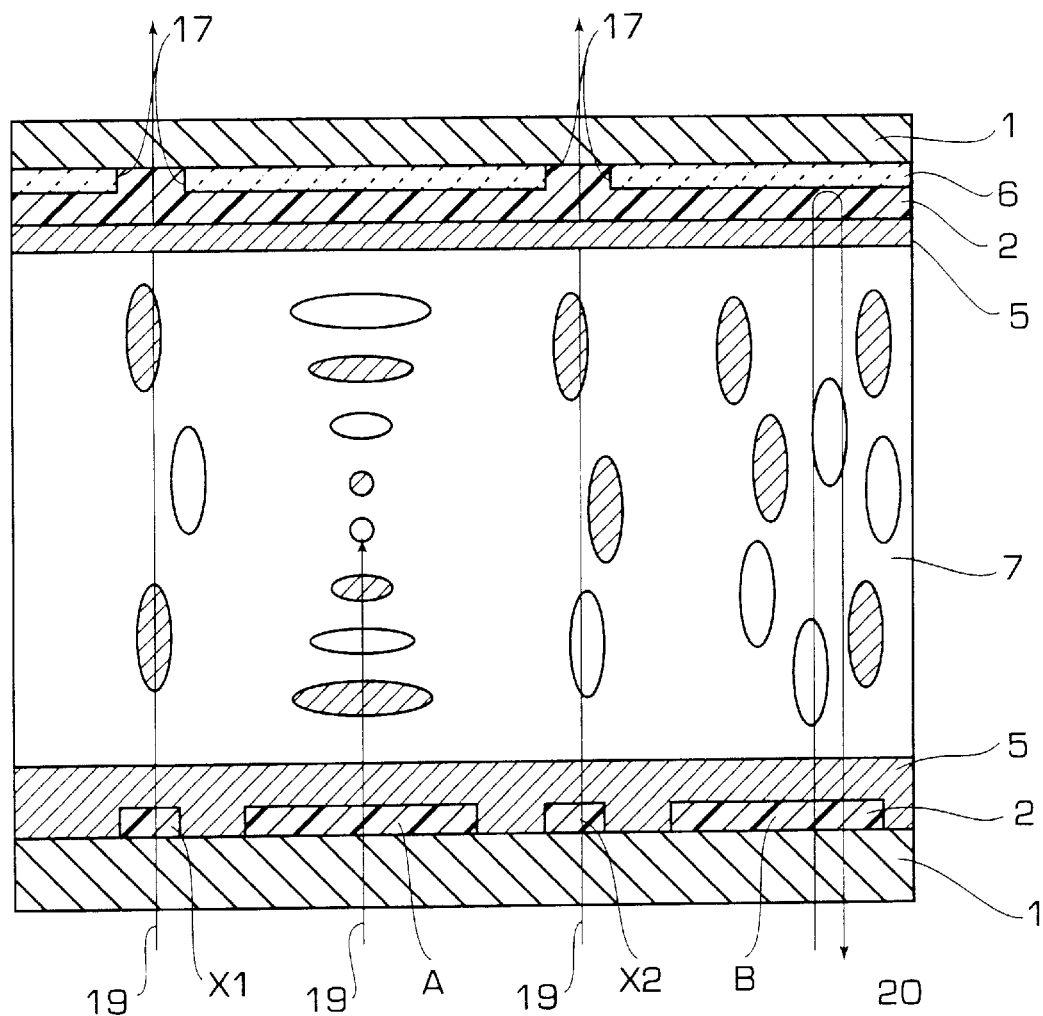
FIG. 4 is a section taken along line E-F in FIG. 1, showing a second example of the present invention.
Figure 5A:
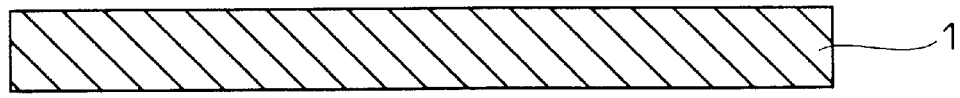
In FIGS. 5, (a) to (e) show sections illustrating a series of steps in the method of making a counter electrode board in accordance with the second example of the present invention.
Figure 5B:
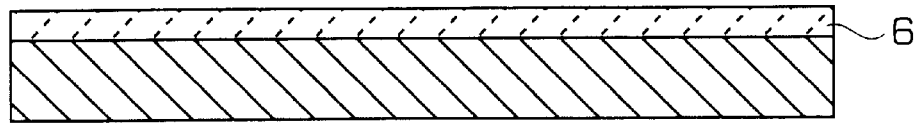
Figure 5C:
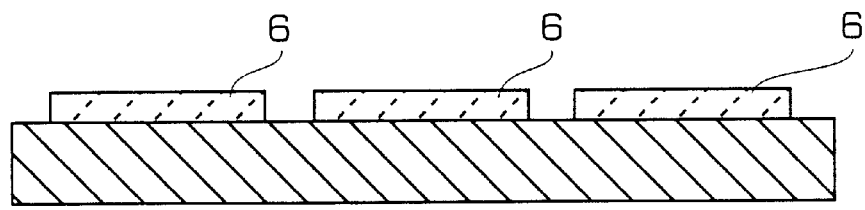
Figure 5D:
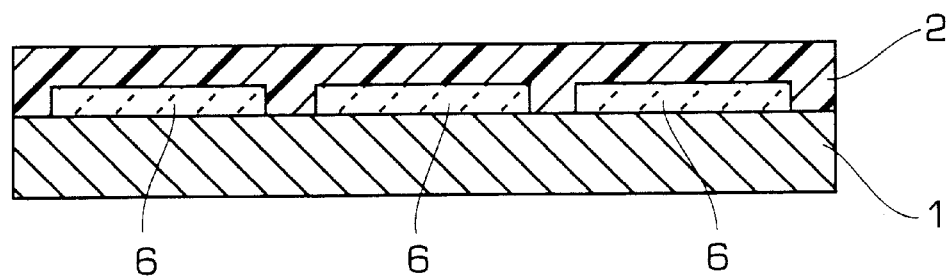
Figure 5E:
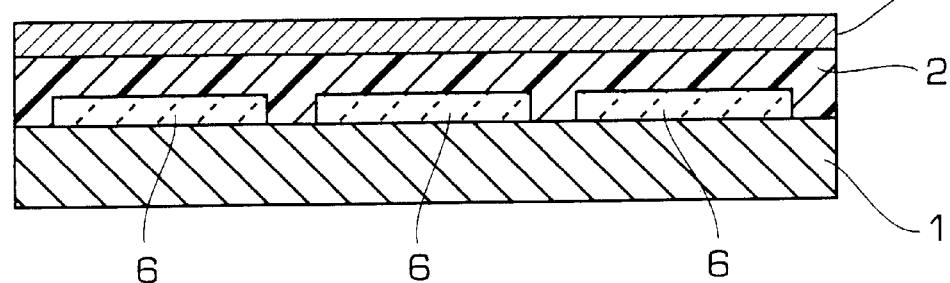

Then, the TFT board and the counter electrode board which have been made in the above-described manner are bonded with a predetermined gap therebetween. First of all, a sealant is printed on the film-bearing surface of the TFT board by means of a seal printer. In order to secure a predetermined gap between the two boards, a gapping material in particulate form is incorporated in the sealant. Then, the TFT board and the counter electrode board are bonded with the sealant so that the film-bearing surfaces thereof face each other. In this step, the two boards are disposed in such a way that, when viewed from the outside of the panel, the patterns of the signal lines on the TFT board are aligned with the slits on the counter electrode board. Finally, using a liquid crystal injector, a GH liquid crystal is injected into the gap between the two boards so bonded. Thus, an active matrix-driven reflection type liquid crystal display as illustrated in FIG. 4 is fabricated.

What is claimed is:

1. A reflection type liquid crystal display comprising;
    an active matrix board comprising active matrix elements at intersections of signal lines and scanning lines, said signal lines formed of a transparent conducting film and said scanning lines formed of a metal,
    a counter electrode board having a reflector layer thereon, and
    a liquid crystal sealed between said active matrix board and said counter electrode board,
    wherein said transparent conducting film and said reflector layer are in parallel planes, and said reflector layer is not formed in any area of said counter electrode board located directly opposite said signal lines, including the areas of said intersections.

2. A reflection type liquid crystal display as claimed in claim 1 wherein a transparent conducting film is formed on the whole surface of said counter electrode board so as to cover said reflector layer.

3. A liquid crystal display unit comprising;
    a thin-film transistor board comprising,
        a first glass substrate layer,
        a conducting film layer including a plurality of signal lines and pixel electrodes, and
        a first insulating layer,
        wherein said conducting layer is disposed between said first glass substrate layer and said first insulating layer,
    a liquid crystal layer, and
    a counter electrode board comprising,
        a second glass substrate layer,
        a reflective layer, and
        a second insulating layer,
        wherein said reflective layer is disposed between said second glass substrate layer and said second insulating layer and is not located at any area directly opposite said signal lines, including areas wherein said signal lines intersect with a plurality of scan lines.

4. The liquid crystal display unit disclosed in claim 3, wherein said counter electrode board further comprises a transparent conducting layer disposed between said reflective layer and said second insulating layer.

* * * * *